June 19, 1956  T. H. THOMPSON  2,750,745
HYDRAULIC TRANSMISSION MECHANISM

Filed May 26, 1954 3 Sheets-Sheet 1

INVENTOR
TOM. H. THOMPSON
BY Robert B Larson
ATTORNEY

June 19, 1956     T. H. THOMPSON     2,750,745
HYDRAULIC TRANSMISSION MECHANISM

Filed May 26, 1954     3 Sheets—Sheet 2

INVENTOR
TOM H. THOMPSON,

BY Robert B. Larson

ATTORNEY

June 19, 1956  T. H. THOMPSON  2,750,745
HYDRAULIC TRANSMISSION MECHANISM
Filed May 26, 1954  3 Sheets-Sheet 3
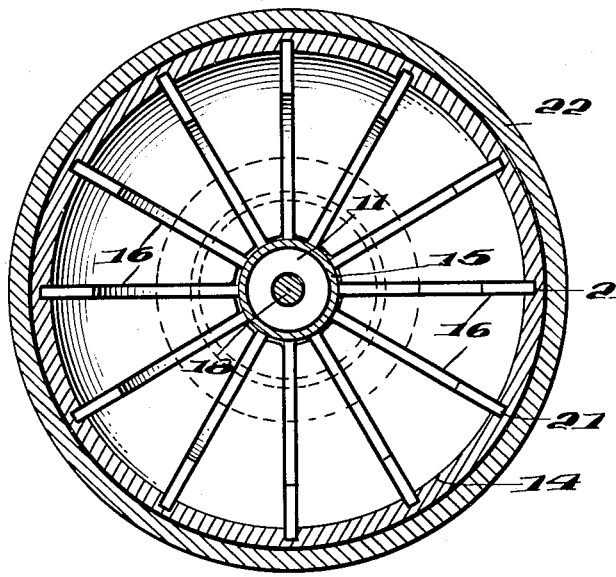
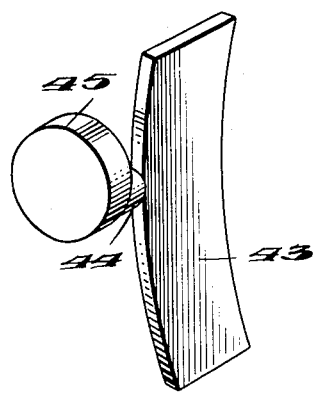
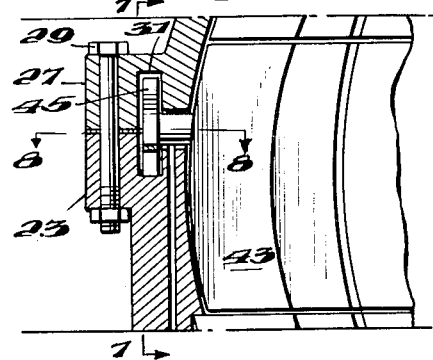
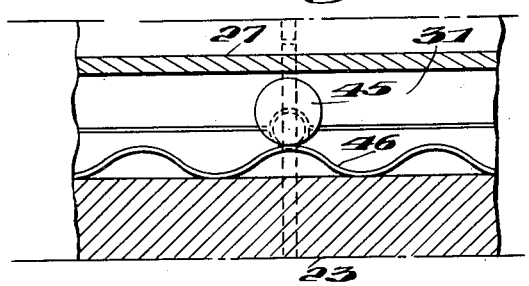
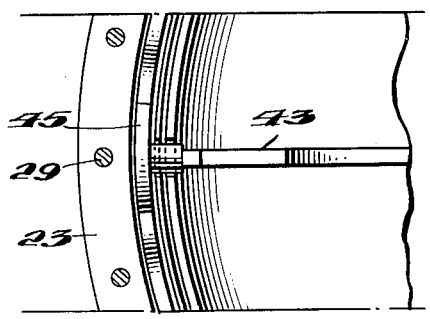
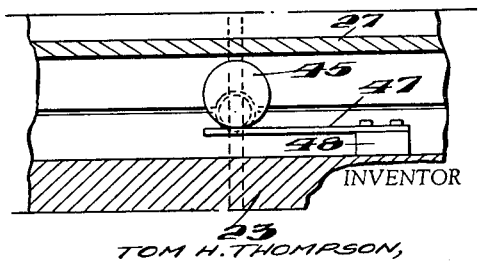
INVENTOR
TOM H. THOMPSON,
BY Robert B. Pearson
ATTORNEY

United States Patent Office 2,750,745
Patented June 19, 1956

2,750,745

HYDRAULIC TRANSMISSION MECHANISM

Tom H. Thompson, Daytona Beach, Fla., assignor to Sabre Research Corporation, Daytona Beach, Fla., a corporation of Florida Application May 26, 1954, Serial No. 432,444

4 Claims. (Cl. 60—54)

This invention relates to a hydraulic transmission mechanism and more specifically to a simplified hydraulic transmission unit which is designed to provide variable speed ratios between a driving and a driven shaft.

The simplest form of transmission unit providing the flexibility of a torque convertor is, of course, a fluid coupling in which an impeller drives an impelled member in a fluid-filled housing. Such units must be used in conjunction with a standard set of gears since the unit does not operate efficiently when coupled directly with the drive shaft of an internal combustion engine. The more complex type of torque convertor provides an infinite number of speed ratios by utilizing a plurality of turbine wheels to be driven by an impeller. This mechanism is effective in accomplishing the desired result but is of necessity a more expensive unit. The purpose of the present invention is to provide a hydraulic transmission mechanism which is relatively simple to construct and yet which may be used without any gearing. In effect, then, this invention is a compromise between the inefficient fluid coupling and the complex expensive torque convertor.

One of the major problems of both the fluid coupling and the torque convertor is in connection with the turbulence and heat of the fluid which dissipates a great deal of energy. The torque convertor requires an independent cooling system to prevent the fluid from becoming heated to the point where it boils. One of the principal purposes of this invention is to provide a device which will to a large extent overcome this problem of turbulence and thereby create a more efficient transmission unit.

The present invention provides an impeller in the form of a set of blades which are disposed on a driving shaft and this impeller may be shifted between neutral and active positions. An impelled set of blades is operatively connected to a driven shaft and both sets of blades are enclosed in a fluid-filled casing. Around the inside of the wall of the casing and adjacent the ends of the impeller and impelled blades is disposed a set of vanes which are pivoted to rotate through approximately 45°. The casing is free to rotate with respect to both the driving and driven shafts and around the periphery of the casing is disposed a brake band which may be used to retain the casing stationary.

In use, the impeller is shifted from the neutral to an active position. Rotation of the impeller initiates rotation of the casing through the force of the fluid against the vanes. The casing while acquiring the speed of the impeller serves to reduce turbulence of the fluid since the vanes are rotating at a rate intermediate the rate of rotation of the impeller and the impelled set of blades. Obviously, the less the difference in the rates of rotation of adjacent sets of blades, the lower is the resultant turbulence in the fluid. Therefore, one of the primary functions of the pivoted vanes is to reduce the turbulence of the fluid when bringing the impelled set of blades up to the rate of rotation of the impeller. To reverse the direction of rotation of the driven shaft it is only necessary to apply the brake band to the casing. The force of the fluid from the impeller against the vanes causes the vanes to pivot and the fluid is redirected against the opposite faces of the blades on the driven shaft. In this manner a reverse drive is provided without the necessity for a separate set of gears as is necessary with the conventional fluid coupling. It can be seen, therefore, that the present invention provides a simple coupling unit which not only incorporates a means to reduce the turbulence of the encased fluid but also provides a reversing means without the necessity for an additional set of gears.

A primary object of this invention is to provide a variable speed hydraulic transmission which is more efficient than the conventional fluid coupling and is less expensive and not as complex as the torque convertors requiring a plurality of turbine wheels.

Another object of this invention is the provision of a transmission unit for connecting a driving shaft to a driven shaft which utilizes sets of blades and a fluid coupling and which does not require a separate set of gears to reverse the direction of rotation of the driven shaft.

Still another object of this invention is to provide a hydraulic transmission mechanism including an impeller and an impelled set of blades in which an intermediate set of vanes is provided which serves to reduce turbulence when the impelled set of blades is being brought up to the speed of rotation of the impeller.

A further object of this invention is to provide a fluid coupling which does not require an independent friction clutch since the impeller may be moved from an active to a neutral position thereby providing, in effect, a self-contained clutch.

Other objects and many of the attendant advantages of of present invention will become apparent in the light of this specification when considered in connection with the accompanying drawings wherein:

Fig. 4 is a sectional view along the lines 4—4 of Fig. 1;

Fig. 5 is a perspective view of a vane;

Fig. 6 is an enlarged sectional view showing the mounting of a vane;

Fig. 7 is a sectional view along the lines 7—7 of Fig. 6;

Fig. 8 is a sectional view along the lines 8—8 of Fig. 6; and

Fig. 9 is a sectional view similar to Fig. 7 showing a modified form of spring mounting.

Figure 1:
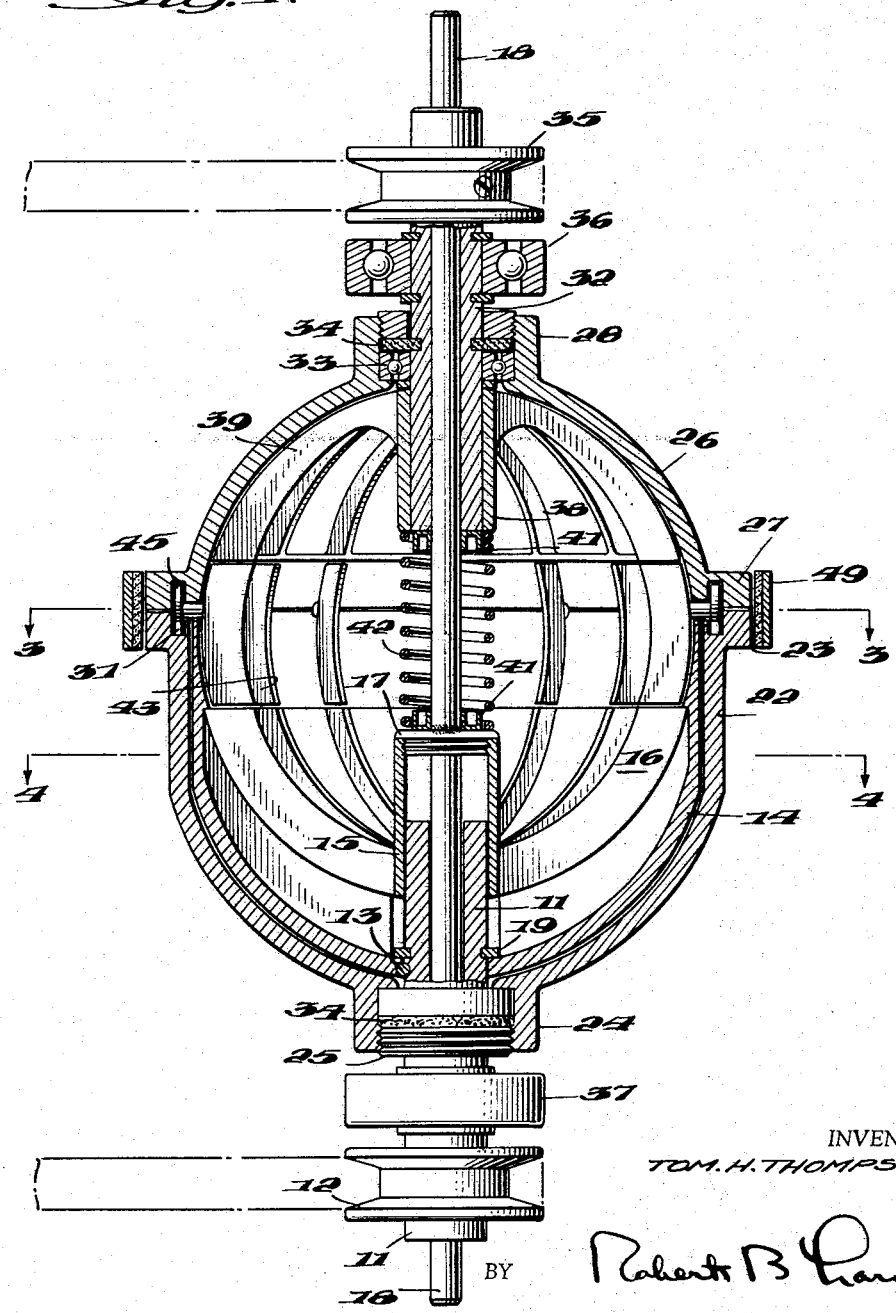
Fig. 1 is a longitudinal sectional view through a fluid coupling embodying the present invention.

Referring now to Fig. 1, there is shown at 11 a drive shaft which is provided with a pulley 12 for suitable connection with any desired power means. In the event that the presently described fluid coupling is used in connection with an internal combustion engine for an automobile, it is obvious that the drive shaft pulley 12 can be omitted, and the shaft 11 can be connected directly with the drive shaft of the engine. The drive shaft 11 is a hollow tubular member for a purpose which will become apparent hereinafter.

Keyed to the drive shaft by means of a pin 13 is a semi-spherical shaped member 14. By virtue of this keying arrangement, the semi-spherical member 14 will rotate with the drive shaft 1 at all times. A sleeve 15 is splined on the inner end of the drive shaft 11 so that the sleeve will rotate with the shaft 11 but is capable of slidable movement thereon. Suitably secured as by welding around the periphery of one end of this sleeve or integrally formed with the sleeve are a plurality of blades 16 which are shaped as shown. The opposite end of this sleeve 15 is provided with internal screw threads to receive an end plate 17. Extending through the entire fluid coupling and through the tubular drive shaft 11 is a control rod 18. This rod is secured within end plate 17 so that endwise movement of rod 18 causes similar movement of sleeve 15 and blades 16. A collar 19 is provided in the drive shaft adjacent the semi-spherical member 14, which collar serves to limit the endwise movement of sleeve 15. Referring to Fig. 4 it can be seen that the blades 16 are received within grooves 21 in the semi-spherical member 14.

Figure 2:
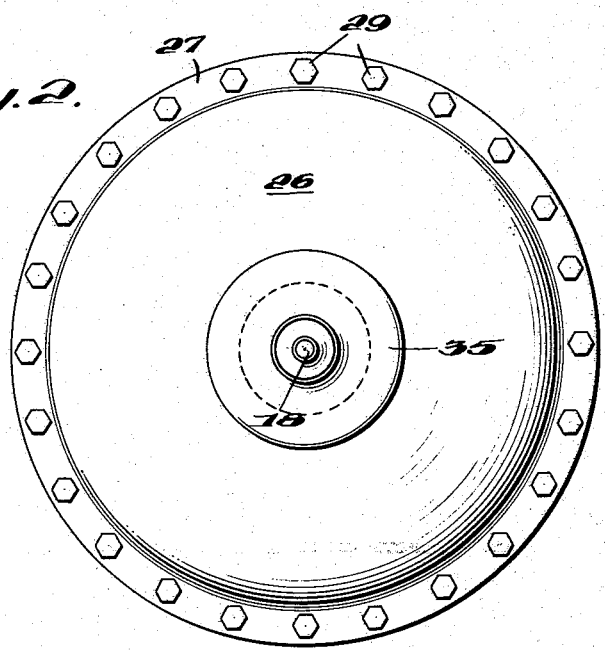
Fig. 2 is an end elevation of Fig. 1.
Figure 3:
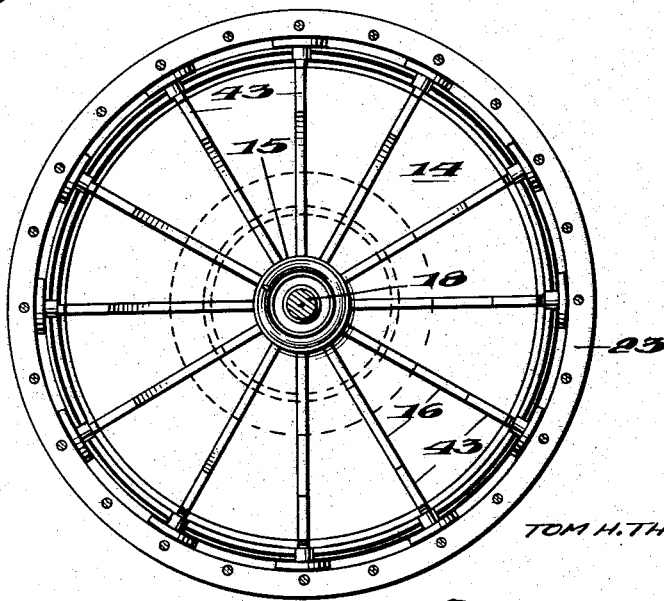
Fig. 3 is a sectional view along the lines 3—3 of Fig. 1.

Enclosing the semi-spherical member 14 is a casing member 22 which is partially tubular and partially spherically formed. This member is provided with end flanges 23 and 24, and a ball bearing unit 25 mounts this member for free rotation with respect to the drive shaft 11. There is further provided a cooperating casing member 26 having flanges 27 and 28. Flanges 23 and 27 are secured together by any suitable means as by bolts 29 as shown in Fig. 2. There is provided a cooperating recess in flanges 23 and 27 for a purpose to be explained more fully hereinafter.

The driven shaft 32 is tubular as shown for the reception of control rod 18. Ball bearing mountings 33 make this shaft freely rotatable with respect to the casing. The ball bearing mountings for the driving and driven shafts adjacent each end of the casing are provided with packing 34 to prevent escape of the fluid retained within the casing. There is shown a pulley 35 by which power may be taken off the driven shaft. In the event that the presently disclosed invention is used with an automobile, it is apparent that the driven shaft would be connected with a differential. There are also shown ball bearings 36 and 37 by means of which the fluid coupling can be mounted on a fixed support.

The driven shaft 32 is provided with a sleeve 38 which is secured to the shaft in any suitable manner for rotation therewith. Secured around the periphery of one end of this sleeve or integral with the sleeve is a plurality of blades 39 which are shaped similarly to the blades 16 previously described. On the end of the driven shaft 32 and on the end of plate 17 there are provided retaining rings 41 for receiving a compression spring 42. Spring 42 normally urges the sleeve 15 to a position in which the blades are adjacent the semi-spherical member 14.

Referring now more particularly to Figs. 5 to 9, there is shown in Fig. 5 a curved blade or vane 43 which is provided with an integral boss 44 to which is affixed a cam 45. The boss 44 is disposed on the vane 43 nearer the end of the vane which is disposed adjacent the ends of the impelled set of blades for a purpose which will become apparent hereinafter. These vanes are mounted on the casing parts 22 and 26 with the cam member 45 located within the recess 31. Referring to Fig. 7, there is shown a spring member 46 which serves to normally retain the cam 45 and associated vane 43 in the position shown. The spring 46 consists of a single strip of metal extending around the entire periphery of the casing or may consist of any number of short strips which are shaped as shown. In Fig. 9 is shown a modification of the spring. In this form of the invention each cam member is provided with an individual spring 47 which is secured by means of block 48 to flange 23 of the casing. The vanes 43 extend around the entire periphery of the casing and are disposed between the ends of the blades on the driving shaft and the blades on the driven shaft. A brake band 49 extends around the outside of the casing parts.

The blades 16 function as an impeller or rotary pump as upon initially rotating driving shaft 11 these blades rotate to set in motion the fluid within the casing. The impeller blades 16 are movable between a neutral position adjacent the semi-spherical member 14, in which position the blades are entirely retracted within the semi-spherical member and an active position in which the ends of the blades 16 are adjacent the ends of the vanes 43. Movement of the impeller blades is accomplished by moving the control rod 18 endwise.

Operation of the presently described hydraulic transmission mechanism is as follows. The blades 16 are moved to an active position and as they are rotated, the force of the fluid imparts rotation to the set of vanes 43 and casing parts 22 and 26 in which they are mounted. As the casing and vanes are entirely free to rotate with respect to both the driving and driven sets of blades, the vanes 43 and casing are rotating at a speed intermediate that of the impeller blades and the stationary or slowly turning impelled blades 39, and it is apparent that these vanes tend to lessen turbulence of the fluid. This is due to the fact that the difference in the rate of rotation of the impeller and the vanes 43 is less than the difference in the rate of rotation of the impeller and impelled blades. Eventually the impelled set of blades, the vanes, the casing and the impeller are all rotating at substantially the same speed.

In order to reverse the direction of rotation of the driven shaft, the brake band 49 is applied to the casing. Consequently, when the impeller is rotated the vanes 43 will pivot approximately 45 degrees and thereby force the fluid against opposite faces of the impelled blades 39. Consequently, the impelled blades are driven in an opposite direction.

It is apparent that the pivoted vanes disposed between the rotary pump and the turbine serve two functions in the present invention. These vanes serve to reduce turbulence when the device is operated in a forward direction and serve to permit operation of the device in a reverse direction without the necessity for an additional set of gears.

It is further apparent that the rotating casing parts 22 and 26 perform the function of a fly wheel when the device is operated in a forward direction. The rotating casing thus serves to store up kinetic energy which is delivered when there is a temporary interruption in the power supply. In this manner such interruptions in power are bridged over so that the power delivered to the driven shaft is smooth and uninterrupted.

As pointed out hereinbefore the impeller blades 16 may be moved from an active position adjacent the vanes 43 to a retracted position in which the blades are completely enclosed within the semi-spherical or inner casing member 14. In the retracted position rotation of the impeller and inner casing has substantially no effect on the fluid within the casing surrounding the vanes and impelled blades so that, in effect, the present fluid coupling is provided with a self-contained clutch.

Obviously many modifications and changes in the design and construction of the present invention may be employed without departing from the essentials thereof. What is claimed as new and desired to be secured by Letters Patent is as follows:

1. A transmission unit for connecting a driving shaft to a driven shaft comprising, in combination, an impeller, driven blades, a fluid-filled casing housing both the impeller and the driven blades, said casing being freely rotatable with respect to both the impeller and the driven blades, vanes pivotally mounted on the inner surface of said casing, said vanes being disposed between the impeller and the driven blades, spring means normally maintaining said vanes in angular alignment with respect to the impeller and driven blades, and means mounted exteriorly of said casing to prevent rotation of said casing whereby the angular position of said vanes is shifted by the fluid in opposition to the force of said spring means in response to movement of said impeller.

2. In a variable speed hydraulic transmission, a fluid-filled normally freely rotatable housing, driving means within said housing including an impeller, driven means disposed within said housing including driven blades, means pivotally mounted in said housing between said impeller and said driven blades for reducing turbulence when said impeller and driven blades are rotating in the same direction and means to prevent rotation of said housing for causing said turbulence reducing means to be pivoted by the fluid to reverse the circumferential flow of fluid between the impeller and driven blades.

3. In a device of the character described, comprising, in combination, a driving member, a sleeve slidably disposed on said driving member and rotatable therewith, a plurality of impeller blades fixedly mounted on said sleeve, a driven member, a plurality of impelled blades operatively connected to said driven member, a casing enclosing both said impeller and impelled blades, said casing being fluid-filled and freely rotatable, vanes pivotally mounted in said casing, said vanes being disposed between said impeller and said impelled blades, spring means normally retaining said vanes in angular alignment with the impeller and impelled blades, brake means for preventing rotation of said casing whereby when the brake means is applied the vanes pivot by fluid reaction in response to rotation of the impeller blades to force the fluid against the impelled blades to reverse the direction of rotation from the driving to the driven members, and control means for shifting the sleeve and impeller blades from operative to inoperative positions.

4. The combination recited in claim 3 wherein the pivotal mounting for said vanes is more closely adjacent said impelled blades than said impeller blades.

References Cited in the file of this patent

UNITED STATES PATENTS

| | | |
|---|---|---|
| 2,015,212 | Beaumont | Sept. 24, 1935 |
| 2,078,597 | Beaumont | Apr. 27, 1937 |
| 2,162,543 | Banner | June 13, 1939 |
| 2,359,930 | Miller | Oct. 10, 1944 |
| 2,501,771 | Gray | Mar. 28, 1950 |
| 2,544,713 | Miller | Mar. 13, 1951 |